Aug. 2, 1966    H. VISSERS    3,263,800
CONVEYING SCREW, SUPPORTED IN THE END WALLS OF A
RECEPTACLE OR A TROUGH
Filed Oct. 6, 1964    2 Sheets-Sheet 1
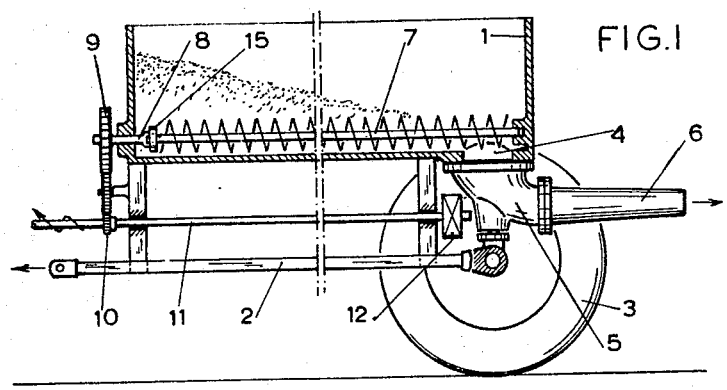
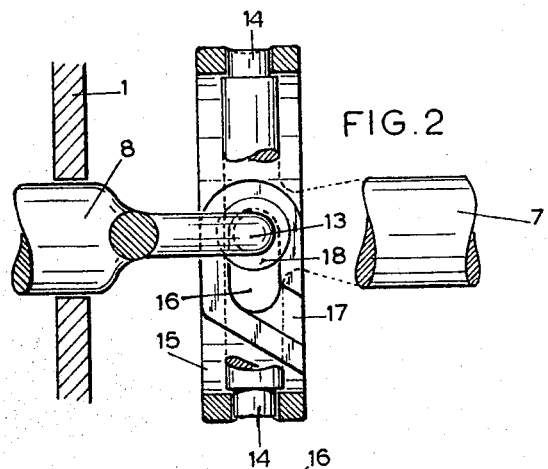
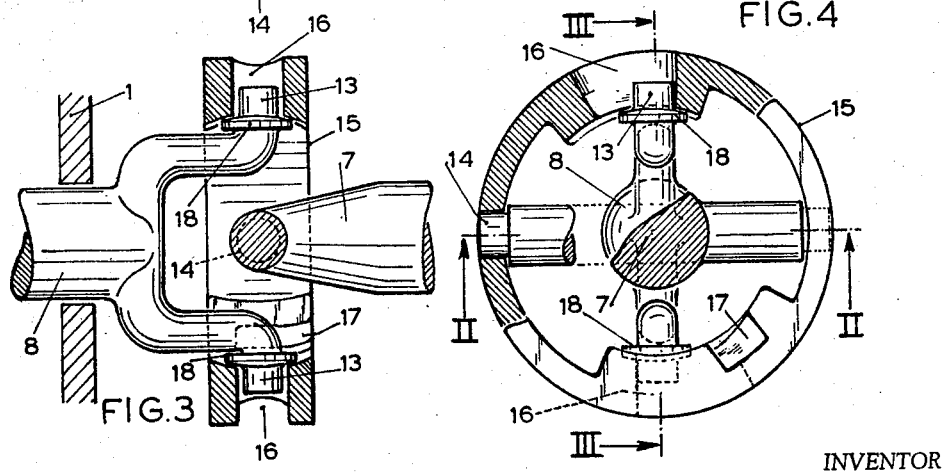
INVENTOR
HERBERT VISSERS
BY
ATTORNEYS

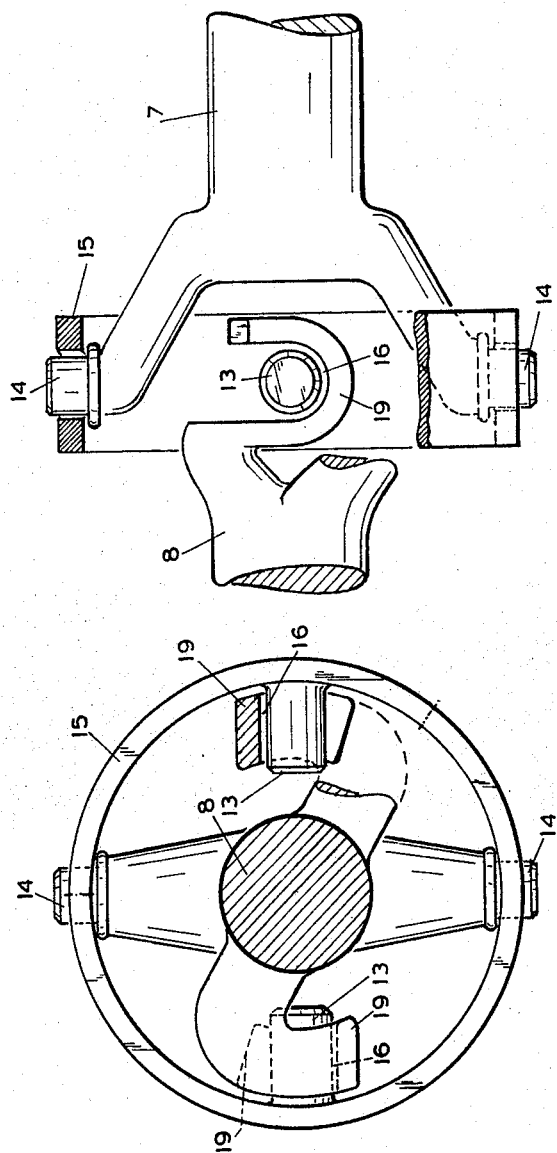

United States Patent Office 3,263,800
Patented August 2, 1966

3,263,800
CONVEYING SCREW, SUPPORTED IN THE END WALLS OF A RECEPTACLE OR A TROUGH
Herbert Vissers, Nieuw Vennep, Netherlands, assignor to Landbouwwerktuigen- en Machinefabriek H. Vissers N.V., Nieuw Vennep, Netherlands
Filed Oct. 6, 1964, Ser. No. 401,845
Cliams priority, application Netherlands, Oct. 23, 1963, 299,652
4 Claims. (Cl. 198—213)

The invention relates to a conveying screw supported in the end walls of a receptacle or a trough and having secured on the end of its shaft projecting outside the receptacle or trough a driving member driving the shaft in one direction of rotation and said shaft being interrupted in the receptacle or trough near the driving member and both shaft portions being connected to each other by a coupling.

When conveying humid or sticky material, crusts are formed on the ribs of the conveying screw, therefore it is required to clean the screw from time to time, so that the coupling between the shaft portions preferably should be disconnectable in order to allow the conveying screw to be raised out of the receptacle. As particularly with relatively long screws they deflect it would be advantageous to provide the shaft near its driving end with a universal coupling, because the deflection of the shaft is then not transmitted to the driving end, so that with such an arrangement the bearing and the driving member do not suffer any unfavourable influence of the deflection.

The invention has for its object to provide a universal coupling of a simple construction in the shaft of the conveying screw in such a manner that the conveying screw by axial displacement may be disconnected from the driving end in order to be raised out of the receptacle. With the conveying screw according to the invention both shaft portions at their adjacent ends are each provided with a pair of pintles which are diametrically opposed and having their axes perpendicularly directed to the axis of the shaft, said pintles each engaging a hole in a Cardan ring and the axes of the one pair of pintles being perpendicular to the axis of the other pair of pintles, each hole of one of the pair of holes being formed to a slot extending in circumferential direction of the ring and said slot opening laterally in one of the side faces of the ring. With said embodiment of the Cardan ring the conveying screw with the ring after rotation of the one shaft portion together with the ring with respect to the other shaft portion may be displaced longitudinally towards the driving side until the shaft of the screw is disengaged from its bearing at the opposite end wall of the receptacle, whereafter the screw can be raised out of the receptacle.

For locking the pintles engaging the slot-like holes in the Cardan ring against radial displacement in the holes they may be provided with a collar.

The invention will be further described with reference to the accompanying drawing illustrating an embodiment of a conveying screw in the storage hopper of a fertilizer spreader.

In the drawing:

FIG. 1 is a sectional elevation of the hopper with the conveying screw located therein.

FIGS. 2 and 3 are axial sectional views of the universal coupling on enlarged scale taken on lines II—II and III—III respectively in FIG. 4, which itself is a cross sectional view of the coupling.

FIGS. 5 and 6 are side and end view respectively, partially in section, of a modified embodiment of the universal coupling.

As shown in FIG. 1 the hopper 1 is carried by a frame 2 provided with a pair of ground wheels 3. Below the outlet 4 of the hopper a bowl 5 at which a spout 6 extends is supported on the frame 2 for swinging movement.

Near the bottom of the hopper 1 a conveying screw 7 is rotatably supported with its free shaft end supported in the adjacent end wall of the hopper. At the driving side the conveying screw 7 by means of a universal coupling is connected to a driving shaft portion 8 to which a driving wheel is secured, said wheel being connected to a shaft 11 by means of gearing 9, 10. Said shaft 11 may receive its drive from the take-off shaft of a tractor to which the frame 2 of the spreader is coupled.

The shaft 11 may also be used for driving the bowl 5 with the spout 6 through the intermediary of a suitable gear 12.

The driving shaft portion 8 is provided with two radial pintles 13 forming part of a fork, detachably connected to the shaft. Also the adjacent end of the shaft of the conveying screw 7 has two similar pintles 14. Said pintles 13, 14 extend in holes of a Cardan ring 15, the holes 16 being slot-shaped and open with a laterally oblique part 17 at the side of the ring 15 remote from the driving side of the screw. Thereby it is rendered possible to rotate the screw 7 together with the ring 15 with respect to the driving shaft portion 8 and to bring the oblique slot parts 17 opposite the pintles 13 so that the screw may be displaced longitudinally and is disengaged from its bearing in the end wall of the receptacle.

As the slots 16 are open outwards no fertilizer can adhere in said slots. In order, however, to yet enclose the pintles 13 in said slots 16 a collar 18 is provided on the pintles.

It is to be noted that the invention is not limited to the embodiment described above and shown in FIGS. 1–4 as various modifications may be made.

It is thus possible to have the legs of the fork of the shaft portion 8 carrying the pintles 13 not extending at the inner side of ring 15 as shown in FIGS. 3 and 4 but at the outer side of said ring and to have the pintles 13 projecting radially inwards at said legs, so that the pintles extend into the holes 16 at the outer circumference of ring 15.

With the modified embodiment of the universal coupling shown in FIGS. 5 and 6 the slots 16 are not provided in Cardan ring 15 but formed by hook-shaped projections 19 at the end of shaft portion 8, and the pintles 13, cooperating with slots 16, extend radially inwardly from the ring 15. It will be clear that also with said modified embodiment the pintles 13 may be disengaged from the U-shaped hooks 19 by rotating the conveying screw 7 with respect to shaft portion 8, whereafter the screw may be displaced longitudinally in order to be disengaged from its bearing in the end wall of the receptacle.

What I claim is:

1. In combination, a trough-like receptacle, a conveying screw supported in the end walls of said receptacle and having a shaft with one end projecting outside the receptacle, a driving member for driving the shaft in one direction of rotation secured to said projecting end of the shaft, said shaft being interrupted in the receptacle near the driving member, and a coupling connecting the interrupted shaft portions, said coupling comprising a universal joint including a Cardan ring, at least one pintle perpendicular to the axis of the shaft secured to one of said ring and shaft for each of said interrupted shaft portions, and a bearing recess for each pintle in the other of said ring and shaft, at least one of said recesses being formed with an elongating slot in the direction opposite the driving direction and a laterally directed communicating end portion so arranged as to permit slight rotation of the Cardan ring opposite to the driving direction and subsequent axial movement of one shaft portion to uncouple the universal joint for removal of the screw from the receptacle.

2. The combination according to claim 1 wherein said coupling comprises a pair of diametrically opposite pintles provided on each interrupted shaft portion and perpendicular thereto, said Cardan ring having a hole forming said bearing recess for each pintle, each hole of one pair of holes having an elongating slot extending circumferentially of the ring and having a laterally directed end portion opening in one of the side faces of the ring.

3. The combination as claimed in claim 2, wherein the pintles engaging the said slotted holes of the ring, are each provided with a collar.

4. The combination according to claim 1 wherein said coupling comprises a first pair of diametrically opposite pintles on one of said interrupted shaft portions, said Cardan ring having a hole for each of said first pair of pintles, the other shaft portion having a pair of U-shaped hooks, and a second pair of pintles on the Cardan ring for releasable engagement in said hooks to couple and uncouple the shaft portions.

References Cited by the Examiner
UNITED STATES PATENTS
3,014,575  12/1961  Klein _____ 198—213

EVON C. BLUNK, *Primary Examiner.*
RICHARD E. AEGERTER, *Examiner.*